United States Patent
Ford et al.

(10) Patent No.: US 6,765,083 B2
(45) Date of Patent: Jul. 20, 2004

(54) SOLVENTS USEFUL IN THE PREPARATION OF POLYMERS CONTAINING HYDROPHILIC AND HYDROPHOBIC MONOMERS

(75) Inventors: James D. Ford, Orange Park, FL (US); Azaam Alli, Jacksonville, FL (US); Ture Kindt-Larsen, Holte (DK)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 48 days.

(21) Appl. No.: 10/012,653

(22) Filed: Oct. 30, 2001

(65) Prior Publication Data

US 2002/0193559 A1 Dec. 19, 2002

Related U.S. Application Data
(60) Provisional application No. 60/245,518, filed on Nov. 3, 2000.

(51) Int. Cl.[7] .................................................. C08F 6/00
(52) U.S. Cl. ........................ 528/491; 134/31; 134/42; 134/901; 264/1.1; 264/2.6; 264/1.36; 264/1.38; 264/85; 264/336; 264/344; 528/480; 528/483; 528/495; 528/496
(58) Field of Search ........................... 134/31, 42, 901; 264/1.1, 136, 1.38, 2.6, 344, 85, 336; 528/480, 481, 483, 495, 496, 491

(56) References Cited

U.S. PATENT DOCUMENTS

| | | | |
|---|---|---|---|
| 4,136,250 A | 1/1979 | Mueller et al. | |
| 4,260,725 A | 4/1981 | Keogh et al. | |
| 5,258,490 A | 11/1993 | Chang | |
| 5,480,946 A | 1/1996 | Mueller et al. | |
| 5,510,442 A | 4/1996 | Bambury et al. | |
| 5,539,016 A | 7/1996 | Kunzler et al. | |
| 5,616,757 A | 4/1997 | Bambury et al. | |
| 5,710,302 A | 1/1998 | Kunzler et al. | |
| 5,714,557 A | 2/1998 | Kunzler et al. | |
| 5,760,100 A | 6/1998 | Nicolson et al. | |
| 5,776,999 A | 7/1998 | Nicolson et al. | |
| 5,789,461 A | 8/1998 | Nicolson et al. | |
| 5,849,811 A | 12/1998 | Nicolson et al. | |
| 5,965,631 A | 10/1999 | Nicolson et al. | |
| 6,514,438 B1 * | 2/2003 | Ayyagari et al. | 264/2.6 |

FOREIGN PATENT DOCUMENTS

| | | |
|---|---|---|
| EP | 0182659 A | 5/1986 |
| EP | 455585 B1 | 3/1994 |
| EP | 0 686 488 B1 | 12/1995 |
| EP | 0940693 A | 9/1999 |
| WO | WO 96/11957 | 4/1996 |
| WO | WO 0102881 A | 1/2001 |
| WO | WO 9104288 | 1/2001 |
| WO | WO 01/23066 | 4/2001 |

OTHER PUBLICATIONS

PCT International Search Report, PCT/US01/47536, Aug. 7, 2002.

* cited by examiner

*Primary Examiner*—Terressa Boykin

(57) ABSTRACT

This invention relates to solvents which may be used to extract polymers that are made of hydrophilic and hydrophobic monomers.

32 Claims, No Drawings

SOLVENTS USEFUL IN THE PREPARATION OF POLYMERS CONTAINING HYDROPHILIC AND HYDROPHOBIC MONOMERS

RELATED APPLICATIONS

This patent application claims priority from a provisional patent application, U.S. Serial No. 60/245,518, which was filed on Nov. 3, 2000.

FIELD OF THE INVENTION

This invention relates to solvents which may be used to extract polymers that are made of hydrophilic and hydrophobic monomers.

BACKGROUND OF THE INVENTION

Silicone hydrogels are polymers that contain both hydrophilic and hydrophobic monomers. When these polymers are used to produce contact lenses, these lenses have high oxygen permeability, good wettability, and good comfort.

Contact lenses produced from silicone hydrogels are typically made by the following procedure. A mixture of hydrophilic and hydrophobic monomers, as well as other components is placed in a lens mold and cured with light. After curing, the lenses, which remain attached to either the front curve or the back curve of the mold, are removed by releasing with a suitable solvent. Typically isopropanol, water or combinations thereof are used. After release, the lenses are extracted with alcohols and/or other organic solvents to remove unreacted hydrophobic monomers. Typically these lenses are extracted with hexane, methylene chloride, isopropanol, or ethanol. For water immiscible solvents, those solvents are removed by evaporation/drying prior to equilibration into aqueous solutions. For water miscible solvents, the lenses are equilibrated into aqueous solutions. Equilibration into aqueous solution will remove any remaining solvent, unreacted hydrophillic monomers, and hydrate the lenses. However, there are problems with this procedure.

First, when the lenses are released using alcohol or alcohol/water mixtures, the lenses swell to a level where a fragile lens, that damages easily, is produced. Second, hydrophobic monomers have limited solubility in mixtures of alcohol and water, as well as some organic solvents. Therefore to extract those monomers lenses must be extracted with large volumes of these solvents and often the solvents must be heated. This presents problems when preparing lenses on a production scale due to the environmental concerns of disposing of large quantities of used solvents. In addition, due to the low flash points of the solvents which are currently used, heating those solvents presents additional hazards. Finally, the final hydration/equilibrium steps require the use of 100% aqueous solvents, such as deionized water, buffer solutions, saline solutions, or other packing solutions. When lenses that have been extracted with alcohols and/or many organic solvents are directly transferred to 100% aqueous solutions, there is an additional risk of damaging the lens due to the variability of swell of the polymer as well as the fragility of the resulting polymer.

Therefore, there remains an unmet need for a method of processing cured polymers that addresses one or more of the problems described above. The invention described herein meets that need.

DETAILED DESCRIPTION OF THE INVENTION

This invention includes a method of extracting cured polymers comprising hydrophobic and hydrophilic monomers, where the method comprises, consists essentially of, or consists of the steps of treating the cured polymer with an extracting solvent, wherein said extracting solvent when measured at 25° C.

(a) swells the cured polymer from about 0% to about 50% and (b) has Hansen Solubility Parameters within the ranges of $\delta H = $ about $[\delta H_{cured\ polymer} + 2.5]$ to about $[\delta H_{cured\ polymer} - 8.5]$ $\delta P = $ about $[\delta P_{cured\ polymer} + 0.5]$ to about $[\delta P_{cured\ polymer} - 4.0]$ and $\delta D = $ about $[\delta D_{cured\ polymer} + 2.5]$ to about $[\delta D_{cured\ polymer} - 2.0]$.

As used herein, "cured polymers" include but are not limited to polymers containing hydrophobic and hydrophilic monomers, hydrogels and silicone hydrogels where silicone hydrogels are the preferred polymers, The particularly preferred polymers are acquafilcon A, lotrafilcon and balafilcon A. The compositions of representative polymers are disclosed in U.S. Pat. Nos. 5,260,000; 5,998,498; 6,087,415; 5,760,100; 5,776,999; 5,789,461 5,849,811; 5,965,631; U.S. patent application Ser. Nos. 09/532,943; 09/652/817; and 09/957,299. These patents and patent applications are hereby incorporated by reference for the composition preparation, and treatment of the polymers contained therein. In addition, cured polymers includes polymers that are coated with hydrophilic coating such as polyacrylic acid, HEMA and the like. Methods of coating such polymers are disclosed in U.S. Pat. No. 6,087,415 and U.S. patent application Ser. No. 09/921,192 which is incorporated by reference in its entirety. All cured polymers of the invention may be formed into a number of useful devices which include but are not limited to contact lenses and intraocular lenses. Methods of forming said devices are known and include but are not limited to molding, cutting, or lathing.

The term "monomer" refers to the building units (backbones, pendant groups and crosslinkers) that are covalently bound to one another within the structure of the cured polymer. Typical hydrophobic monomers include but are not limited to methacryloxypropyltris(trimethylsiloxy) silane ("TRIS"), monomethacryloxypropyl terminated polydimethylsiloxane ("mPDMS"), and silicone macromers as described in U.S. Pat. Nos. 5,998,498; 6,087,415; U.S. patent application Ser. Nos. 09/532,943; 09/652/817; and 09/957,299. Hydrophilic monomers include but are not limited to n-vinylpyrrolidone ("NVP"), N,N-dimethylacrylamide ("DMA"), 2-hydroxyethyl methacrylate ("HEMA"), methacrylic and acrylic acids, vinyl lactams, acrylamides, methacrylamide, vinyl carbonate and vinyl carbamate monomers which are disclosed in U.S. Pat. No. 5,070,215, and oxazolone monomers which are disclosed in U.S. Pat. No. 4,910,277. All aforementioned patents are hereby incorporated by reference in their entirety. The cured polymers may contain other hydrophobic and hydrophilic components, which include but are not limited to wetting agents and the like. Although those components may be extracted by the extracting solvents of the invention, it is preferred that those agents are not extracted by the extracting solvents of the invention.

When the cured polymers are hydrogels those polymers have the property that they can absorb water into the matrix of the polymer. Typically cured polymers are treated with a solvent to remove any unreacted components (ca. monomers, macromers, crosslinkers), and subsequently the polymer is treated with an aqueous solution in order to hydrate the hydrogel. However, depending upon the solvent that was used to remove the unreacted components, the final hydration step cannot be carried out directly after treatment with the extracting solvent. For example, a cured polymer that was extracted with hexane can not be directly equilibrated in water without distorting the final polymer. Typically this problem is solved by treating the extracted polymer with a series of different solvents before the final aqueous equilibration step. One of the benefits of this invention is that when cured polymers are extracted using some of the extracting solvents of this invention, the polymers may be directly equilibrated into aqueous media immediately after extraction without using the step down procedure described above. Extracting solutions of the invention that have this advantage include but are not limited to 85–90% DPM/DI and 85–90% TPM. This presents a distinct advantage over the known extracting solutions, because it saves time and the cost of the extra steps.

As used herein the swell of a cured polymer in a solvent is the percentage increase in diameter of a cured polymer and may be calculated by the either of the following formula % swell=100×[(lens diameter in extracting solvent−lens diameter in aqueous solution)/lens diameter in aqueous solution]

The percentage of swell is greater than about 0 to about 50%, preferably, about 20 to about 40% and more preferably, about 25 to about 35%.

In addition, the extracting solvents of the invention must have certain Hansen Solubility Parameters, namely $\delta H$, $\delta P$, and $\delta D$. Those parameters are within the following ranges $\delta H$=about [$\delta H_{cured\ polymer}$+2.5] to about [$\delta H_{cured\ polymer}$−8.5]

$\delta P$=about [$\delta P_{cured\ polymer}$+0.5] to about [$\delta P_{cured\ polymer}$−4.0] and $\delta D$=about [$\delta D_{cured\ polymer}$+2.5] to about [$\delta D_{cured\ polymer}$−2.0]

where $\delta H_{cured\ polymer}$, $\delta P_{cured\ polymer}$, and $\delta D_{cured\ polymer}$ are determined using the method substantially as described in CHARLES M. HANSEN, HANSEN SOLUBILITY PARAMETERS: A USERS HANDBOOK, 43–53 CRC Press 2000, and CMH's SPHERE computer program for the calculations.

For example, if a cured polymer has a $\delta H_{cured\ polymer}$ of 11.5 $MPa^{1/2}$, $\delta P_{cured\ polymer}$ of 6.1 $MPa^{1/2}$, and $\delta D_{cured\ polymer}$ 16.5 $MPa^{1/2}$, the Hansen values of appropriate extraction solvents are $\delta H$ about 3 to about 14, $\delta P$ about 2 to about 6.6, and $\delta D$ about 14.0 to about 19.0.

The preferred extraction solvents include but are not limited to solvents of Formula I

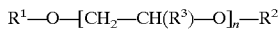

$R^1$—O—[$CH_2$—$CH(R^3)$—O]$_n$—$R^2$      I wherein $R^1$ is hydrogen, $C_{1-6}$alkyl, $C_{1-6}$alkylcarbonyl, aminocarbonyl, —$SO_3H$, phenyl, or substituted phenyl where the phenyl substituents are $C_{1-6}$alkyl, $C_{1-6}$alkoxy, amino, nitro, or halogen;

$R^2$ is hydrogen, $C_{1-6}$alkyl, $C_{1-6}$alkylcarbonyl, aminocarbonyl, —$SO_3H$ phenyl, or substituted phenyl where the phenyl substituents are $C_{1-6}$alkyl, $C_{1-6}$alkoxy, amino, nitro, or halogen;

$R^3$ is hydrogen, $C_{1-6}$alkyl phenyl, $C_{1-6}$alkylcarbonyl, aminocarbonyl, —$SO_3H$, phenyl, or substituted phenyl where the phenyl substituents are $C_{1-6}$alkyl, $C_{1-6}$alkoxy, amino, nitro, or halogen; and n is 1–10.

The preferred $R^1$ is selected from the group consisting of $C_{1-6}$alkyl and $C_{1-6}$alkylcarbonyl, where the more preferred $R^1$ is selected from the group consisting of $C_{1-6}$alkyl, and the particularly preferred $R^1$ is methyl. The preferred $R^2$ is selected from the group consisting of $C_{1-6}$alkyl and $C_{1-6}$alkylcarbonyl, where the more preferred $R^2$ is selected from the group consisting of $C_{1-5}$alkylcarbonyl, and the particularly preferred $R^2$ is acetyl or hydrogen. The preferred $R^3$ is selected from the group consisting of $C_{1-5}$alkyl and $C_{1-6}$alkylcarbonyl where the more preferred $R^3$ is $C_{1-6}$alkyl, and the particularly preferred $R^3$ is hydrogen. The preferred n is 1–5.

Examples of extracting solvents include but are not limited to ethylene glycol-n-butyl ether, diethylene glycol-n-butyl ether, diethylene glycol methyl ether, ethylene glycol phenyl ether, propylene glycol methyl ether, dipropylene glycol methyl ether, tripropylene glycol methyl ether, propylene glycol methyl ether acetate, dipropylene glycol methyl ether acetate, propylene glycol-n-propyl ether, dipropylene glycol-n-propyl ether, tripropylene glycol-n-butyl ether, propylene glycol-n-butyl ether, dipropylene glycol-n-butyl ether, tripropylene glycol-n-butyl ether, tripropylene glycol-n-propyl ether, proplyene glycol phenyl ether, dipropylene glycol dimethyl ether, propyl acetate, and methyl isobutyl ketone. The particularly preferred extracting solvents are butyl acetate, dipropylene glycol methyl ether acetate (DPMA), diproplyeneglycol methyl ether (DPM), dipropyleneglycol dimethyl ether (DMM), tripropylene glycol methyl ether (TPM), and mixtures thereof. In addition the particularly preferred solvents mixtures of DPMA, DMM, DPM, or TPM with water or propylene glycol. The most preferred solvent for a cured polymer having $\delta H_{cured\ polymer}$ of 11.5 $MPa^{1/2}$, $\delta P_{cured\ polymer}$ of 6.1 $MPa^{1/2}$, and $\delta D_{cured\ polymer}$ 16.5 $MPa^{1/2}$ is dipropylene glycol methyl ether acetate.

As stated above, the choice of extracting solvent is driven by the physical properties of the cured polymer. More than one component can used in the extracting solvent, where, depending upon the physical properties of the cured polymer, it is preferable that the extracting solvent contain two or more components. For example if the cured polymer is a silicone hydrogel where the majority of its surface is hydrophobic, it would be preferred to use a combination of a hydrophobic solvent having relatively low hydrogen bonding affinity with a hydrophilic solvent having low molecular weight and high hydrogen bonding affinity. The majority of said extracting solvent contains the hydrophobic solvent where the percentage of hydrophobic solvent is about 20 to about 98% (percent by weight), more preferably about 70 to about 98%, most preferably about 80 to about 90%. The molecular weight of the hydrophilic solvent of this extracting solvent is about 15 to about 200 Daltons, more preferably about 15 to about 100 Daltons. Examples of such solvents include 90:10 (parts by weight), DPMA:DI, 90:10 DMM:DI, 90:10 DPMA:propylene glycol, 90:10 DMM:propylene glycol. In these examples DPMA and DMM are the hydrophobic solvents having low hydrogen bonding affinity, while propylene glycol and DI are the hydrophilic solvents having high hydrogen bonding affinity and low molecular weights.

If the cured polymer is a silicone hydrogel where its hydrophobic surface is coated with a hydrophilic polymer such as polyacrylic acid or poly HEMA, it would be preferred to use solvent mixtures that contain hydrophobic solvents that have moderately high hydrogen bonding affinity and hydrophilic solvents having low molecular weight and relatively high hydrogen bonding affinity. The majority of said extracting solvent contains the hydrophobic solvent where the percentage of hydrophobic solvent is about 20 to about 98% (percent by weight), more preferably about 70 to about 98%, most preferably about 80 to about 90% 70 to about 98% (percent by weight), more preferably about 80 to about 90%. The molecular weight of the hydrophilic solvent of this extracting solvent is about 15 to about 200 Daltons, more preferably about 15 to about 100 Daltons. Examples of such solvents include 90:10, TPM:DI, 90:10 DPM:DI, 90:10 TPM:propylene glycol, 90:10 DPM:propylene glycol. In these examples TPM and DPM are hydrophobic solvents and propylene glycol and DI are the low molecular weight solvents having relatively high hydrogen bonding affinity.

Although the choice of extracting solvent is critical to this invention, the method may be improved by adjusting certain physical parameters. For example, a greater percentage of unreacted hydrophobic monomers can be removed by raising the temperature of the solvent, agitating said solvent, increasing the time of the extraction procedure and any combination thereof.

Further the invention includes a method of releasing and extracting cured polymers comprising hydrophobic and hydrophilic monomers, where the method comprises, consists essentially of, or consists of the steps of treating the cured polymer with an extracting solvent, wherein said extracting solvent when measured at 25° C.

(a) swells the cured polymer to at least 15%, and
(b) has Hansen Solubility Parameters within the ranges of
$\delta H$=about [$\delta H_{cured\ polymer}$+2.5] to about [$\delta H_{cured\ polymer}$−8.5]
$\delta P$=about [$\delta P_{cured\ polymer}$+0.5] to about [$\delta P_{cured\ polymer}$−4.0] and
$\delta D$=about [$\delta D_{cured\ polymer}$+2.5] to about [$\delta D_{cured\ polymer}$−2.0]

The terms hydrophobic and hydrophilic monomer and extracting solvent have their aforementioned definitions and preferred ranges. The preferred polymers are contact lenses and intraocular lenses.

Still further the invention includes a polymer that is made by a method of extracting cured polymers comprising hydrophobic and hydrophilic monomers, where the method comprises, consists essentially of, or consists of the steps of treating the cured polymer with an extracting solvent, wherein said extracting solvent when measured at 25° C.

(a) swells the cured polymer from about 0% to about 50%, and
(b) has Hansen Solubility Parameters within the ranges of
$\delta H$=about [$\delta H_{cured\ polymer}$+2.5] to about [$\delta H_{cured\ polymer}$−8.5]
$\delta P$=about [$\delta P_{cured\ polymer}$+0.5] to about [$\delta P_{cured\ polymer}$−4.0] and
$\delta D$=about [$\delta D_{cured\ polymer}$+2.5] to about [$\delta D_{cured\ polymer}$−2.0]

In order to illustrate the invention the following examples are included. These examples do not limit the invention. They are meant only to suggest a method of practicing the invention. Those knowledgeable in polymers as well as other specialties may find other methods of practicing the invention. However, those methods are deemed to be within the scope of this invention. All of the references cited in this application are hereby incorporated by reference.

EXAMPLES

The following abbreviations were used in the examples

IPA=isopropanol
DI=deionized water
DMM=dipropylene glycol dimethyl ether
DPMA=dipropylene glycol methyl ether acetate
DPM=dipropylene glycol methyl ether
TPM=tripropylene glycol methyl ether
Macromer A=the macromer substantially prepared as described in Example 25 of U.S. patent application Ser. No. 09/957,299
mPDMS=monomethacryloxypropylterminated polydimethylsiloxane (MW 800–1000)

Example 1

Evaluation of DPMA and IPA as Extracting Solvents

The ability of DPMA to serve as an effective extracting solvent was evaluated by examining levels of unreacted hydrophobic monomers from cured lenses. A residual level is defined as the amount of monomer(s) that remain unreacted or unpolymerized after a lens is adequately cured. The monomer mixture that comprises acquafilcon A was loaded to 7 frames (56 lenses) and cured for 8 minutes to 60 minutes, at 55–70° C., using dimethyl-3-octanol as a diluent and visible light (visible light wavelength: 380–460 nm with a peak maximum at 425 nm, dose: approx. 2.5 J/cm$^2$). The resulting lenses were de-molded (lenses on front curve), and removed from the frames using tweezers.

Five lenses were accurately weighed into five individual glass scintillation vials and 5 mL of DPMA (DOWANOL®) was pipetted into each vial. Vials 1 though 5 were sonicated for 1 hr at 25, 35, 50, 60, and 70° C., respectively. Concurrent experiments were set up using iPA as the extracting solvent. The resulting extracts were analyzed for macromer and mPDMS and the levels (weight percent) obtained are tabulated in Tables 1 and 2. The samples were analyzed for these monomers because they are the most hydrophobic components in the final polymer. These figures show that DPMA extracts these hydrophobic monomers at a level which is comparable to IPA over a range of temperatures, where the levels are most comparable at 60° C. and 70° C.

TABLE 1

Temperature and Solvent Effects on Residual Macromer Extraction from Lenses

| Temp. ° C. | DPMA % [by lens weight] | IPA % [by lens weight] |
| --- | --- | --- |
| 25 | 0.355 | 0.486 |
| 35 | 0.460 | 0.549 |
| 50 | 0.480 | 0.566 |
| 60 | 0.524 | 0.586 |
| 70 | 0.519 | 0.565 |

TABLE 2

Temperature and Solvent Effects on Residual mPDMS Extraction from Lenses

| Temp. ° C. | DPMA % [by lens weight] | IPA % [by lens weight] |
| --- | --- | --- |
| 25 | 0.477 | 0.490 |
| 35 | 0.472 | 0.491 |
| 50 | 0.475 | 0.484 |
| 60 | 0.486 | 0.503 |
| 70 | 0.490 | 0.486 |

Example 2

Temperature Effect on Leachable Levels of Hydrophobic Monomers from Cured Polymers with DPMA This experiment determines the level of leachable hydrophobic monomers which can be obtained from cured polymers that were extracted with DPMA. A leachable level is defined as the amount of a monomer (or monomers) obtained after a polymer has been cured, extracted and hydrated and then, subsequently extracted with another solvent. Typically the subsequent extraction solvent is iPA. The monomer mixture that comprises acquafilcon A was loaded to frames and cured for 8 minutes to 60 minutes, at 55–70° C., using dimethyl-3-octanol, as a diluent and visible light (visible light (wavelength: 380–460 nm with a peak maximum at 425 nm, dose: approx. 2.5 J/cm$^2$). The resulting lenses, 3 frames (24 lenses) were de-molded (lenses on front curve), strapped to cyclic olefin copolymer (TOPAS®) leaching/hydration vehicles and placed in a jacketed 1 L beaker, controlled by a circulating water heater/cooler. The extracting solvent, DPMA (850 mL) was added (~35 mL/lens) and agitated by a magnetic stirrer for 90 min at 25° C. At the end of the extraction, the vehicles (with frames and lenses) were placed in de-ionized water at 15° C., controlled by a circulating water heater/cooler. The water was agitated by circulation at high speed using an immersion water circulator. After 1 hr, 10 lenses were withdrawn, blotted dry and accurately weighed into a scintillation vial. Five mL of iPA was added to the vial and the vial was sonicated for 1 hr. Samples were prepared in duplicate and analyzed for leachable mPDMS 1000 and macromer. Concurrent experiments were run using DPMA as the extracting solvent at temperature of 35, 50. 60, and 70° C., respectively. The results of these experiments are tabulated in Table 3. The results show that at all temperatures, the leachable level for mPDMS is less than 175 ppm (mg/Kg on a lens wt. basis). Typically levels of 600–1000 ppm are obtained when iPA is used as the initial extracting solvent. The level of leachable macromer decreases with increasing extraction temperature and leachable levels at 60° C. and 70° C. are comparable with levels observed for IPA (600–1000 ppm). This finding demonstrates that there is a significant advantage in using DPMA as an extraction solvent rather than IPA. In a production environment, due to IPA's low flash point (12° C.) and high vapor pressure (45.8 mmHg @ 25° C.). However, due to DPMA's high flash point (187° C.) and low vapor pressure (0.08 mmHg @ 20° C.) this solvent may be used at elevated temperatures without the accompanying safety hazards.

TABLE 3

Temperature Effect on Leachable mPDMS and Macromer Extraction with DPMA

| Temp. ° C. | mPDMS (mg/Kg) | Macromer (mg/Kg) |
|---|---|---|
| 25 | <175 | 2732 |
| 35 | <175 | 1250 |
| 50 | <175 | 862 |
| 60 | <175 | 656 |
| 70 | <175 | 581 |

Example 3

Analysis of Leachable Levels of Hydrophobic Monomers from Cured Polymers with DMM This experiment determines the level of leachable hydrophobic monomers which can be obtained from cured polymers, initially processed or extracted with DMM. In example 2, extraction was accomplished in a cyclic olefin copolymer (TOPAS®) leaching/hydration vehicles, whereas in this example extraction was done in scintillation vials. The monomer mixture that comprises acquafilcon A was loaded to the frames and cured for 8 minutes to 60 minutes, at 55–70° C., using dimethyl-3-octanol, as a diluent and visible light (visible light (wavelength: 380–460 nm with a peak maximum at 425 nm, dose: approx. 2.5 J/cm$^2$).

Ten lenses were removed from frames and placed into each of 6 scintillation vials. 10 mL DMM (1 mL per lens, PROGLYDE®) was added to each vial and shaken for 30 minutes at 175 rpm on a Thermolyne Type 50000 Maxi-mix III. At the end of this period, lenses from vial 1 were equilibrated in 250 mL DI water, by shaking for 1 hr at 175 rpm. After equilibration, the 10 lenses were harvested, blotted dry and accurately weighed into a scintillation vial. Five mL of isopropanol was added to the vial and the vial was sonicated for 1 hr. The iPA extract was analyzed for leachable mPDMS and macromer. The DMM from the remaining vials were decanted, and 10 mL aliquot of fresh DMM was added to each vial. The vials were shaken for 10 minutes, which constituted "1 cycle". The procedure was repeated to generate samples after 5 cycles, with fresh DMM replacing the extract at the start of each cycle. Following each cycle, lenses were equilibrated in DI water and subsequently extracted with iPA as described above. The iPA extracts were analyzed for leachable mPDMS and macromer. The data is tabulated in Table 4.

TABLE 4 mPDMS and Macromer Extraction using DMM
(Residual levels - mPDMS: 6706 mg/Kg, macromer: 7184 mg/Kg)

| Time (min)/Cycle | mPDMS (mg/Kg) | Macromer (mg/Kg) |
|---|---|---|
| 30 | 1031 | 2678 |
| 40/Cycle 1 | <225 | 1879 |
| 50/Cycle 2 | <225 | 1807 |
| 60/Cycle 3 | <225 | 1595 |
| 70/Cycle 4 | <225 | 1513 |
| 80/Cycle 5 | <225 | 1531 |

Example 4

Comparison of % Swell of Cured Polymer in a Variety of Solvents

The procedure for testing the swell of a polymer in a number of testing solvents is described in this example. The monomer mixture of acquafilcon A was dosed into molds and cured for 8 minutes to 60 minutes, at 55–70° C., using dimethyl-3-octanol, as a diluent and visible light (visible light (wavelength: 380–460 nm with a peak maximum at 425 nm, dose: approx. 2.5 J/cm$^2$). The resulting discs, (thickness range of 70–110 μm) were fully hydrated by releasing from the molds in 60:40 isopropanol (IPA)/deionized (DI) water, extracting additional residual monomers using five aliquots of 100% IPA over a period of ten hours (two hours/aliquot) and then equilibrated in deionized water. These lenses were then equilibrated in the various testing solvents as well as physiological saline. Measurements of lens' diameters were made and a comparison of % swell made. The % swell was calculated using the following equation:

% swell=100×[(lens diameter in extracting solvent−lens diameter in physiological saline)/lens diameter in physiological saline]

The data for % swell at 25° C. is tabulated in Table 5. In addition, since the volatility and flammability for DPMA is relatively low, this particular solvent could be utilized at higher processing temperatures. The matrix swell of the polymer in DPMA, over the temperature range investigated (25–70° C.), was determined and found to be linear.

TABLE 5

% Swell in Various Test Solvents

| Test Solvent | % Swell |
|---|---|
| Physiological Saline | 0 |
| DI Water | 0.56 |
| IPA | 52.36 |
| n-Butyl Acetate | 31.12 |
| Proglyde DMM* | 29.83 |
| Dowanol DPMA* | 24.24 |
| Dowanol DPMA @ 35° C. | 26.84 |
| Dowanol DPMA @ 50° C. | 30.74 |
| Dowanol DPMA @ 60° C. | 31.91 |
| Dowanol DPMA @ 70° C. | 34.91 |

Example 5

Comparison of % Swell of Coated Cured Polymer in a Variety of Solvents

Contact lenses coated with poly HEMA were prepared as described in Example 14 of U.S. patent application Ser. No. 09/921,192. Using the method of Example 4, the lenses were released and equilibrated in three different solvent mixtures. For this example only, the swell was calculated using the following formula, where the diameter of the lens mold is the diameter of the mold that forms the cured article $$\% \text{ swell}_{lens\ mold\ method} = 100 \times [(\text{lens diameter in extracting solvent} - \text{diameter lens mold})/\text{diameter lens mold}]$$

Calculating the swell by this method results in a percentage swell$_{lens\ mold\ method}$ that is from about 1 to about 5%, preferably about 1 to about 2% greater than calculating the percent swell using the diameter of the polymer in an aqueous solution. 100% DPM, 100% TPM, 90:10 DPM:DI, 90:10 TPM:DI, and 90:10 IPA:DI were tested at 60° C. and the percentage swell$_{lens\ mold\ method}$ was 49.3%, 46.5%, 26.5%, 17.3%, and 51% respectively. A summary of the data collected for the percentage of swell in different solvent systems is presented in Tables 6, 7, and 8 below. This data shows that aqueous mixtures of TPM and DPM are the preferred solvents for extracting a poly HEMA coated lens.

TABLE 6

DPM Solvent System @ 60° C. (remainder H$_2$O)

| Solvent Composition | Swell$_{lens\ mold\ method}$ (%) |
|---|---|
| 100 | 49.3 |
| 95 | 35.7 |
| 90 | 26.5 |
| 85 | 19.9 |

TABLE 7

TPM Solvent System @ 60° C. (remainder H$_2$O)

| Solvent Composition | Swell$_{lens\ mold\ method}$ (%) |
|---|---|
| 100 | 46.5 |
| 95 | 28.8 |
| 90 | 17.3 |
| 85 | 12.6 |

TABLE 8

TPM Solvent System @ 80° C. (remainder H$_2$O)

| Solvent Composition | Swell$_{lens\ mold\ method}$ (%) |
|---|---|
| 100 | 42.3 |
| 95 | 36.1 |
| 90 | 22.3 |
| 85 | 15.6 |

Example 6

Hydration of Lenses

This procedure demonstrates that lenses extracted using a solvent with limited solubility in aqueous solutions, such as DPMA may be equilibrated directly to aqueous solution without inducing internal stresses. Use of IPA as an extraction solvent yielded lenses with a large variation in final lens' diameter uniformity even with a step-down gradient. A longer, slower step-down gradient from IPA to aqueous solution was examined and the lenses found to have a tighter statistical distribution for lens' diameter. Lenses extracted in DPMA and equilibrated directly to aqueous solution also demonstrated a tighter distribution, removing the necessity of the additional processing step.

The monomer mixture of acquafilcon A was dosed into molds and cured for 8 minutes to 60 minutes, at 55–70° C., using dimethyl-3-octanol, as a diluent and visible light (visible light (wavelength: 380–460 nm with a peak maximum at 425 nm, dose: approx. 2.5 J/cm$^2$):

60:40, IPA/DI water release from molds, extraction in 100% IPA and a step-down gradient to aqueous solution equilibration in increments of 30, 60, 100%.

60:40, IPA/DI water release from molds, extraction in 100% IPA and a step-down gradient to aqueous solution equilibration in increments of 10, 20, 30, 40, 50, 75, 100%.

100% DPMA release and extraction and direct aqueous equilibration.

Measurement of lens' diameters on 10 lenses were made in both x and y direction (to pick up any lenses that might be out-of-round) for each condition. The diameter data is presented in Table 9.

TABLE 9

Comparison of Extraction/Equilibration Condition

| Hydration Conditions | Lens # | Dia. x (mm) | Dia. y (mm) | Dia. Avg. (mm) |
|---|---|---|---|---|
| 60:40 DI/IPA | 1 | 14.177 | 14.314 | 14.246 |
| Release | 2 | 14.150 | 14.152 | 14.151 |
| IPA Extraction | 3 | 14.171 | 14.165 | 14.168 |

TABLE 9-continued

Comparison of Extraction/Equilibration Condition

| Hydration Conditions | Lens # | Dia. x (mm) | Dia. y (mm) | Dia. Avg. (mm) |
|---|---|---|---|---|
| Abbreviated Step-Down | 4 | 14.179 | 14.208 | 14.194 |
| | 5 | 14.152 | 14.222 | 14.187 |
| | 6 | 14.170 | 14.154 | 14.162 |
| | 7 | 14.227 | 14.177 | 14.202 |
| | 8 | 14.144 | 14.188 | 14.166 |
| | 9 | 14.179 | 14.194 | 14.187 |
| | 10 | 14.345 | 14.183 | 14.264 |
| | Avg | 14.189 | 14.196 | 14.193 |
| | Std | 0.059 | 0.047 | 0.052 |
| | Max | 14.345 | 14.314 | 14.345 |
| | Min | 14.144 | 14.152 | 14.144 |
| | Range | 0.201 | 0.162 | 0.201 |
| 60:40 IPA/DI Release IPA Extraction Gradual Step-Down | 1 | 14.111 | 14.163 | 14.137 |
| | 2 | 14.112 | 14.148 | 14.130 |
| | 3 | 14.108 | 14.159 | 14.134 |
| | 4 | 14.128 | 14.125 | 14.127 |
| | 5 | 14.149 | 14.119 | 14.134 |
| | 6 | 14.135 | 14.170 | 14.153 |
| | 7 | 14.186 | 14.136 | 14.161 |
| | 8 | 14.129 | 14.138 | 14.134 |
| | 9 | 14.144 | 14.126 | 14.135 |
| | 10 | 14.128 | 14.081 | 14.105 |
| | Avg | 14.133 | 14.137 | 14.135 |
| | Std | 0.023 | 0.026 | 0.024 |
| | Max | 14.186 | 14.170 | 14.186 |
| | Min | 14.108 | 14.081 | 14.081 |
| | Range | 0.078 | 0.089 | 0.105 |
| DPMA Release DPMA Extraction Direct Equilibration | 1 | 14.597 | 14.606 | 14.602 |
| | 2 | 14.615 | 14.610 | 14.613 |
| | 3 | 14.591 | 14.588 | 14.590 |
| | 4 | 14.614 | 14.616 | 14.615 |
| | 5 | 14.614 | 14.613 | 14.614 |
| | 6 | 14.602 | 14.586 | 14.594 |
| | 7 | 14.612 | 14.610 | 14.611 |
| | 8 | 14.599 | 14.604 | 14.602 |
| | 9 | 14.591 | 14.589 | 14.590 |
| | 10 | 14.588 | 14.593 | 14.591 |
| | Avg | 14.602 | 14.602 | 14.602 |
| | Std | 0.011 | 0.011 | 0.011 |
| | Max | 14.615 | 14.616 | 14.616 |
| | Min | 14.588 | 14.586 | 14.586 |
| | Range | 0.027 | 0.030 | 0.030 |

Example 7

Release of Lenses Using a Variety of Extraction Solvents

The monomer mixture of acquafilcon A was dosed into molds and cured for 8 minutes to 60 minutes, at 55–70° C., using dimethyl-3-octanol, as a diluent and visible light (visible light wavelength: 380–460 nm with a peak maximum at 425 nm, dose: approx. 2.5 J/cm$^2$). Subsequently, the lenses were subjected to a variety of solvents to release the lenses from the molds. The four groups of solvents utilized were IPA, 60:40 IPA/DI, DMM and DPMA and the release was conducted at ambient temperature. The time necessary for the lenses to release from the molds and the physical characteristics during release were observed and recorded. The data presented in Table 10, shows that both DMM and DPMA have distinct advantages over IPA or IPA in combination with DI (which has an equivalent % swell to DPMA) due to the time of release and/or the physical manner of release of the lenses.

TABLE 10

Comparison of Lens Release

| Solvent | Release Time (min) | % Swell | Physical Appearance |
|---|---|---|---|
| IPA | <10 | 52 | Lenses swell rapidly forming wrinkles and folds and often creating stress at the interface with the mold, resulting in fractures in the lenses. |
| 60:40 IPA/DI | 60–90 | 25 | Lenses swell first in the center (the thinner portion of the lens), form wrinkles & folds and then pull free from the edges. |
| DMM | 20–30 | 30 | Lenses swell relatively slowly and uniformly throughout the bulk of the lens, resulting in a uniform release from the mold. |
| DPMA | 20–30 | 24 | Lenses swell relatively slowly and uniformly throughout the bulk of the lens, resulting in a uniform release from the mold. |

Example 8

Release of Coated Lenses Using a Variety of Extraction Solvents

Contact lenses coated with poly HEMA were prepared as described in Example 14 of U.S. patent application Ser. No. 09/921,192. Using the method of Example 7, the lenses were released from the molds and equilibrated in the solution for about 2 hours. The temperature, release time swell and amount of extracted residuals were recorded in Table 11. Immediately after release from the mold materials the lenses exhibited some physical distortion (wrinkled edges). However lenses in all tested solutions equilibrated within 15–20 minutes after release to give smooth rounded lenses. This example proves that lenses released and extracted with the tested solvents swell far less than lenses released and extracted with IPA. In addition, this demonstrates that lenses extracted with these extracting solvents may be equilibrated directly into water without using a step down procedure.

TABLE 11

| Solvent System (remainder H$_2$O) | Temperature (° C.) | Release Time (min) | Swell (%) (lens target dia. 14.2 mm) | Leachables (mg/Kg) | |
|---|---|---|---|---|---|
| 85% DPM | 60 | 22 | 19.9 | mPDMS | <285 |
| | | | | Macromer | 4603 |
| | | | | Tris | 0.77 |
| | | | | HCPK | 2.47 |
| | | | | Norblock | <3 |
| 90% DPM | 60 | 18 | 26.5 | mPDMS | <286 |
| | | | | Macromer | 4087 |
| | | | | Tris | 1.61 |
| | | | | HCPK | 2.13 |
| | | | | Norblock | <3 |

TABLE 11-continued

| Solvent System (remainder H$_2$O) | Temperature (° C.) | Release Time (min) | Swell (%) (lens target dia. 14.2 mm) | Leachables (mg/Kg) | |
|---|---|---|---|---|---|
| 85% TPM | 60 | 53 | 12.6 | mPDMS | 568 |
| | | | | Macromer | 4961 |
| | | | | Tris | 1.98 |
| | | | | HCPK | 1.00 |
| | | | | Norblock | <3 |
| 85% TPM | 80 | 18 | 15.6 | mPDMS | <289 |
| | | | | Macromer | 5046 |
| | | | | Tris | 1.78 |
| | | | | HCPK | 1.99 |
| | | | | Norblock | <3 |
| 90% TPM | 80 | 26 | 22.3 | mPDMS | 860 |
| | | | | Macromer | 4964 |
| | | | | Tris | 2.28 |
| | | | | HCPK | 1.13 |
| | | | | Norblock | <3 |
| 90% TPM | 60 | 30 | 17.3 | mPDMS | 335 |
| | | | | Macromer | 4428 |
| | | | | Tris | 1.55 |
| | | | | HCPK | 0.9 |
| | | | | Norblock | <3 |

What is claimed is:

1. A method of extracting cured polymers comprising hydrophobic and hydrophilic monomers, where the method comprises the steps of treating the cured polymer with an extracting solvent of Formula I $$R^1-O-[CH_2-CH(R^3)-O]_n-R^2 \quad \text{I}$$

wherein
R$^1$ is hydrogen, C$_{1-6}$alkyl, C$_{1-6}$alkylcarbonyl, aminocarbonyl, —SO$_3$H, phenyl, or substituted phenyl where the phenyl substituents are C$_{1-6}$alkyl, C$_{1-6}$alkoxyl, amino, nitro, or halogen;
R$^2$ is hydrogen, C$_{1-6}$alkyl, C$_{1-6}$alkylcarbonyl, aminocarbonyl, —SO$_3$H, phenyl, or substituted phenyl where the phenyl substituents are C$_{1-6}$alkyl, C$_{1-6}$alkoxyl, amino, nitro, or halogen;
R$^3$ is C$_{1-6}$alkyl phenyl C$_{1-6}$alkylcarbonyl, aminocarbonyl, —SO$_3$H, phenyl, or substituted phenyl where the phenyl substituents are C$_{1-6}$alkyl, C$_{1-6}$alkoxyl, amino, nitro, or halogen; n is 1–10;
wherein said extracting solvent when measured at 25° C.
(a) swells the cured polymer from about 0% to about 50%, and
(b) has Hansen Solubility Parameters within the ranges of
δH=about [δH$_{cured\ polymer}$+2.5] to about [δH$_{cured\ polymer}$−8.5]
δP=about [δP$_{cured\ polymer}$+0.5] to about [δP$_{cured\ polymer}$−4.0] and
δD=about [δD$_{cured\ polymer}$+2.5] to about [δD$_{cured\ polymer}$−2.0].

2. A method of releasing and extracting cured polymers comprising hydrophobic and hydrophilic monomers, where the method comprises the steps of treating the cured polymer with an extracting solvent of Formula I $$R^1-O-[CH_2-CH(R^3)-O]_n-R^2 \quad \text{I}$$

wherein
R$^1$ is hydrogen, C$_{1-6}$alkyl, C$_{1-6}$alkylcarbonyl, aminocarbonyl, —SO$_3$H, phenyl, or substituted phenyl where the phenyl substituents are C$_{1-6}$alkyl, C$_{1-6}$alkoxyl, amino, nitro, or halogen;
R$^2$ is hydrogen, C$_{1-6}$alkyl, C$_{1-6}$alkylcarbonyl, aminocarbonyl, —SO$_3$H, phenyl, or substituted phenyl where the phenyl substituents are C$_{1-6}$alkyl, C$_{1-6}$alkoxyl, amino, nitro, or halogen;
R$^3$ is hydrogen, C$_{1-6}$alkyl phenyl C$_{1-6}$alkylcarbonyl, aminocarbonyl, —SO$_3$H, phenyl, or substituted phenyl where the phenyl substituents are C$_{1-6}$alkyl, C$_{1-6}$alkoxyl, amino, nitro, or halogen; n is 1–10;
wherein said extracting solvent when measured at 25° C.
(a) swells the cured polymer to at least about 50% and
(b) has Hansen Solubility Parameters within the ranges of
δH=about [δH$_{cured\ polymer}$+2.5] to about [δH$_{cured\ polymer}$−8.5]
δP=about [δP$_{cured\ polymer}$+0.5] to about [δP$_{cured\ polymer}$−4.0] and
δD=about [δD$_{cured\ polymer}$+2.5] to about [δD$_{cured\ polymer}$−2.0].

3. A polymer that is prepared by a method of extracting cured polymers comprising hydrophobic and hydrophilic monomers, where the method comprises the steps of treating the cured polymer with an extracting solvent of Formula I $$R^1-O-[CH_2-CH(R^3)-O]_n-R^2 \quad \text{I}$$

wherein
R$^1$ is hydrogen, C$_{1-6}$alkyl, C$_{1-6}$alkylcarbonyl, aminocarbonyl, —SO$_3$H, phenyl, or substituted phenyl where the phenyl substituents are C$_{1-6}$alkyl, C$_{1-6}$alkoxyl, amino, nitro, or halogen;
R$^2$ is hydrogen, C$_{1-6}$alkyl, C$_{1-6}$alkylcarbonyl, aminocarbonyl, —SO$_3$H, phenyl, or substituted phenyl where the phenyl substituents are C$_{1-6}$alkyl, C$_{1-6}$alkoxyl, amino, nitro, or halogen;
R$^3$ is hydrogen, C$_{1-6}$alkyl phenyl C$_{1-6}$alkylcarbonyl, aminocarbonyl, —SO$_3$H, phenyl, or substituted phenyl where the phenyl substituents are C$_{1-6}$alkyl, C$_{1-6}$alkoxyl, amino, nitro, or halogen; n is 1–10;
wherein said extracting solvent when measured at 25° C.
(a) swells the cured polymer form about 0% to about 50% and
(b) has Hansen Solubility Parameters within the ranges of
δH=about [δH$_{cured\ polymer}$+2.5] to about [δH$_{cured\ polymer}$−8.5]
δP=about [δP$_{cured\ polymer}$+0.5] to about [δP$_{cured\ polymer}$−4.0] and
δD=about [δD$_{cured\ polymer}$+2.5] to about [δD$_{cured\ polymer}$−2.0].

4. A method of extracting cured polymers comprising hydrophobic and hydrophilic monomers, where the method comprises the steps of treating the cured polymer with a liquid extracting solvent, wherein said extracting solvent when measured at 25° C.;
(a) swells the cured polymer form about 0% to about 50%, and
(b) has Hansen Solubility Parameters within the ranges of
δH=about [δH$_{cured\ polymer}$+2.5] to about [δH$_{cured\ polymer}$−8.5]
δP=about [δP$_{cured\ polymer}$+0.5] to about [δP$_{cured\ polymer}$−4.0] and
δD=about [δD$_{cured\ polymer}$+2.5] to about [δD$_{cured\ polymer}$−2.0].

5. The method of claim 1 wherein said extracting solvent is selected from the group consisting of butyl acetate, propylene glycol methyl ether acetate, dipropylene glycol N-propyl ether, tripropylene glycol N-propyl ether, dipropylene glycol N-butyl ether, dipropylene glycol dimethyl ether dipropylene glycol methyl ether acetate, dipropylene glycol methyl ether, tripropylene glycol methyl ether and mixtures thereof.

6. The method of claim 1 wherein said extracting solvent is selected from the group consisting of butyl acetate, dipropylene glycol dimethyl ether dipropylene glycol methyl ether acetate, dipropylene glycol methyl ether tripropylene glycol methyl ether, and mixtures thereof.

7. The method of claim 1 wherein δH is about 3.0 to about 14, δP is about 2 to about 6.6, and δD is about 14.0 to about 19.

8. The method of claim 1 wherein said extracting solvent comprises dipropylene glycol methyl ether acetate, dipropylene glycol methyl ether, or tripropylene glycol methyl ether.

9. The method of claim 1 wherein said extracting solvent further comprises deionized water.

10. The method of claim 1 wherein said extracting solvent further comprises propylene glycol or deionized water.

11. The method of claim 1 wherein said extracting solvent comprises about 70 to about 98 percent by weight dipropylene glycol methyl ether, or tripropylene glycol methyl ether and about 2 to about 30 percent by weight propylene glycol or deionzed water.

12. The method of claim 1 wherein said extracting solvent comprises about 80 to about 90 percent by weight dipropylene glycol methyl ether, or tripropylene glycol methyl ether and about 10 to about 20 percent by weight propylene glycol or deionzed water.

13. The method of claim 1 or claim 12 wherein said cured polymer is an ophthalmic device.

14. The method of claim 1 wherein the swell of the cured polymer is about 15% to about 40%.

15. The method of claim 2 wherein said extracting solvent is selected from the group consisting of butyl acetate, propylene glycol methyl ether acetate, dipropylene glycol N-propyl ether, tripropylene glycol N-propyl ether, dipropylene glycol N-butyl ether, dipropylene glycol dimethyl ether dipropylene glycol methyl ether acetate, dipropylene glycol methyl ether, tripropylene glycol methyl ether and mixtures thereof.

16. The method of claim 2 wherein said extracting solvent is selected from the group consisting of butyl acetate, dipropylene glycol dimethyl ether dipropylene glycol methyl ether acetate, dipropylene glycol methyl ether tripropylene glycol methyl ether, and mixtures thereof.

17. The method of claim 2 wherein δH is about 3.0 to about 14, δP is about 2 to about 6.6, and δD is about 14.0 to about 19.

18. The method of claim 2 wherein said extracting solvent comprises dipropylene glycol methyl ether acetate, dipropylene glycol methyl ether, or tripropylene glycol methyl ether.

19. The method of claim 18 wherein said extracting solvent further comprises deionized water.

20. The method of claim 18 wherein said extracting solvent further comprises propylene glycol.

21. The method of claim 2 wherein said extracting solvent comprises about 80 to about 90 percent by weight dipropylene glycol methyl ether, or tripropylene glycol methyl ether and about 10 to about 20 percent by weight propylene glycol or deionzed water.

22. The method of claim 2 wherein said extracting solvent comprises about 70 to about 98 percent by weight dipropylene glycol methyl ether, or tripropylene glycol methyl ether and about 2 to about 30 percent by weight propylene glycol or deionzed water.

23. The method of claim 2 wherein said cured polymer is a contact lens.

24. The method of claim 2 wherein the swell of the cured polymer is about 15% to about 40%.

25. The polymer of claim 3 wherein said extracting solvent is selected from the group consisting of butyl acetate, propylene glycol methyl ether acetate, dipropylene glycol N-propyl ether, tripropylene glycol N-propyl ether, dipropylene glycol N-butyl ether, dipropylene glycol dimethyl ether dipropylene glycol methyl ether acetate, dipropylene glycol methyl ether, tripropylene glycol methyl ether and mixtures thereof.

26. The polymer of claim 3 wherein said extracting solvent is selected from the group consisting of butyl acetate, dipropylene glycol dimethyl ether dipropylene glycol methyl ether acetate, dipropylene glycol methyl ether tripropylene glycol methyl ether, and mixtures thereof.

27. The polymer of claim 3 wherein δH is about 3.0 to about 14, δP is about 2 to about 6.6, and δD is about 14.0 to about 19.

28. The polymer of claim 3 wherein said extracting solvent comprises dipropylene glycol methyl ether acetate, dipropylene glycol methyl ether, or tripropylene glycol methyl ether.

29. The polymer of claim 28 wherein said extracting solvent further comprises deionized water.

30. The polymer of claim 28 wherein said extracting solvent further comprises propylene glycol.

31. The polymer of claim 3 wherein said extracting solvent comprises about 80 to about 90 percent by weight dipropylene glycol methyl ether, or tripropylene glycol methyl ether and about 10 to about 20 percent by weight propylene glycol or deionzed water.

32. The polymer of claim 3 wherein said extracting solvent comprises about 70 to about 98 percent by weight dipropylene glycol methyl ether, or tripropylene glycol methyl ether and about 2 to about 30 percent by weight propylene glycol or deionzed water.

* * * * *